(12) United States Patent
Chiang et al.

(10) Patent No.: US 10,651,933 B1
(45) Date of Patent: May 12, 2020

(54) THERMAL CALIBRATION OF A RING MODULATOR

(71) Applicant: Xilinx, Inc., San Jose, CA (US)

(72) Inventors: Ping-Chuan Chiang, Singapore (SG); Kee Hian Tan, Singapore (SG); Gourav Modi, Singapore (SG); Nakul Narang, Singapore (SG); Haibing Zhao, Singapore (SG); Yohan Frans, Palo Alto, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/421,425

(22) Filed: May 23, 2019

(51) Int. Cl.
  *H04B 10/079* (2013.01)
  *G02F 1/025* (2006.01)
  *G02F 1/015* (2006.01)

(52) U.S. Cl.
  CPC ......... *H04B 10/0799* (2013.01); *G02F 1/025* (2013.01); *H04B 10/0795* (2013.01); *G02F 2001/0155* (2013.01)

(58) Field of Classification Search
  None
  See application file for complete search history.

(56) References Cited

U.S. PATENT DOCUMENTS

| | | | |
|---|---|---|---|
| 6,600,788 B1 | 7/2003 | Dick et al. | |
| 6,876,698 B1 | 4/2005 | Dick et al. | |
| 9,261,716 B2 * | 2/2016 | Akiyama | G02F 1/0147 |
| 9,348,154 B2 * | 5/2016 | Hayakawa | G02F 1/025 |
| 9,559,704 B1 | 1/2017 | Wong et al. | |
| 9,933,639 B1 | 4/2018 | Lin et al. | |
| 10,042,131 B1 | 8/2018 | Lesea | |
| 10,054,806 B2 | 8/2018 | Lin et al. | |
| 10,215,925 B1 * | 2/2019 | Knights | G02B 6/12007 |
| 10,409,135 B2 * | 9/2019 | Zid | G02B 6/29398 |
| 10,432,315 B2 * | 10/2019 | Chen | H04B 10/506 |
| 2010/0200733 A1 * | 8/2010 | McLaren | G02B 6/12007 250/214 C |
| 2012/0062974 A1 * | 3/2012 | Manipatruni | G02F 1/011 359/238 |

(Continued)

OTHER PUBLICATIONS

Li et al., A 25 Gb/s, 4.4 V-Swing, AC-Coupled Ring Modulator-Based WDM Transmitter with Wavelength Stabilization in 65 nm CMOS, 2015, IEEE (Year: 2015).*

(Continued)

*Primary Examiner* — Jai M Lee
(74) *Attorney, Agent, or Firm* — Paradice and Li LLP (57) ABSTRACT

Systems and methods for calibrating a ring modulator are described. A system may include a controller configured to provide a first test signal to the ring modulator, determine a first candidate temperature control signal for a heater of the ring modulator when the first test signal is provided to the ring modulator, determine a first optical swing of an optical signal at a drop port of the ring modulator, determine a second candidate temperature control signal for the heater when the first test signal is provided to the ring modulator, determine a second optical swing of an optical signal at the drop port, select an optimal optical swing from the first optical swing and the second optical swing, and select one of the first candidate temperature control signal or the second candidate temperature control signal based on the optimal optical swing selected.

20 Claims, 8 Drawing Sheets

(56) References Cited

U.S. PATENT DOCUMENTS

| | | | | |
|---|---|---|---|---|
| 2014/0169724 A1* | 6/2014 | Ingels | ................... | G02F 1/29 |
| | | | | 385/9 |
| 2014/0321848 A1* | 10/2014 | Sekiguchi | ............ | G02F 1/0123 |
| | | | | 398/38 |
| 2015/0160482 A1* | 6/2015 | Amberg | ............... | G02F 1/0147 |
| | | | | 385/1 |
| 2015/0263190 A1* | 9/2015 | Knights | ................. | G02F 1/011 |
| | | | | 250/201.1 |
| 2015/0355482 A1* | 12/2015 | Akiyama | ............... | H01S 3/107 |
| | | | | 385/2 |
| 2015/0381277 A1* | 12/2015 | Shimizu | .............. | H04B 10/572 |
| | | | | 398/34 |
| 2016/0013865 A1* | 1/2016 | Dutt | ....................... | H04J 14/02 |
| | | | | 398/139 |
| 2017/0010485 A1* | 1/2017 | Amberg | ............... | G02F 1/0121 |

OTHER PUBLICATIONS

Li et al., Active resonance wavelength stabilization for silicon microring resonators with an in-resonator defect-state-absorption-based photodetector, 2015, Optical Society of America (Year: 2015).*

Wang, Zhao, Silicon micro-ring resonator modulator for inter/intra-data centre applications, 2017 (Year: 2017).*

Li, et al., A 25 Gb/s, 4.4 V-Swing, AC-Coupled Ring Modulator-Based WDM Transmitter with Wavelength Stabilization in 65 nm CMOS, IEEE Journal of Solid-State Circuits, vol. 50, No. 12, pp. 3145-3159, Dec. 2015.

\* cited by examiner

THERMAL CALIBRATION OF A RING MODULATOR

TECHNICAL FIELD

Aspects of the present disclosure generally relate to integrated circuits, and specifically to a system and method for thermal calibration and operation of a ring modulator.

BACKGROUND

Optical transceivers may be used for high speed data transfers (e.g., greater than 25 Gbps per channel), such as for datacenters. An optical transmitter or receiver may include one or more optical ring resonators or ring modulators (RMs) for datacenter interconnects for transmitting or receiving modulated signals. For example, a 5×25 Gbps wavelength-division multiplexing (WDM) transceiver may include five RMs for a transmitter integrated circuit (IC) and five RMs for a receiver IC.

RMs may have a small feature size to reduce parasitic penalties and area penalties corresponding to other types of modulators (such as a traveling wave Mach-Zehnder (TWMZ) modulator). However, environmental temperature changes for an RM may negatively impact an output jitter of the RM and thus affect performance of the transmitter or receiver. Thus, it may be desirable to control the environmental temperature for an RM to reduce output jitter and improve performance of the transmitter or receiver.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Systems and methods for calibrating a ring modulator are described. An example system for calibrating a ring modulator includes one or more test signal insertion lines configured to provide one or more test signals to a ring modulator during a calibration mode and a controller. The controller is configured to provide a first test signal to the ring modulator via the one or more test signal insertion lines, determine a first candidate temperature control signal for a heater of the ring modulator when the first test signal is provided to the ring modulator, adjust a temperature of the heater using the first candidate temperature control signal, determine a first optical swing of an optical signal at a drop port of the ring modulator when the first candidate temperature control signal is provided to the heater, determine a second candidate temperature control signal for the heater when the first test signal is provided to the ring modulator, adjust the temperature of the heater using the second candidate temperature control signal, determine a second optical swing of an optical signal at the drop port when the second candidate temperature control signal is provided to the heater, select an optimal optical swing from the first optical swing and the second optical swing, and select one of the first candidate temperature control signal or the second candidate temperature control signal, based on the optimal optical swing, to be provided to the heater during an operation mode of the ring modulator.

An example method includes providing, by a controller and during a calibration mode of the ring modulator, a first test signal to the ring modulator. The method also includes determining a first candidate temperature control signal for a heater of the ring modulator when the first test signal is provided to the ring modulator, adjusting a temperature of the heater using the first candidate temperature control signal, and determining a first optical swing of an optical signal at a drop port of the ring modulator when the first candidate temperature control signal is provided to the heater. The method further includes determining a second candidate temperature control signal for the heater when the first test signal is provided to the ring modulator, adjusting the temperature of the heater using the second candidate temperature control signal, and determining a second optical swing of an optical signal at the drop port when the second candidate temperature control signal is provided to the heater. The method also includes selecting an optimal optical swing from the first optical swing and the second optical swing and selecting one of the first candidate temperature control signal or the second candidate temperature control signal, based on the optimal optical swing, to be provided to the heater during an operation mode of the ring modulator.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the present disclosure. The term "coupled" as used herein means coupled directly to or coupled through one or more intervening components or circuits. Further, "coupled" as used herein means electrically coupled, optically coupled, physically connected, or other suitable couplings. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed or frequency-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

Figure 1:
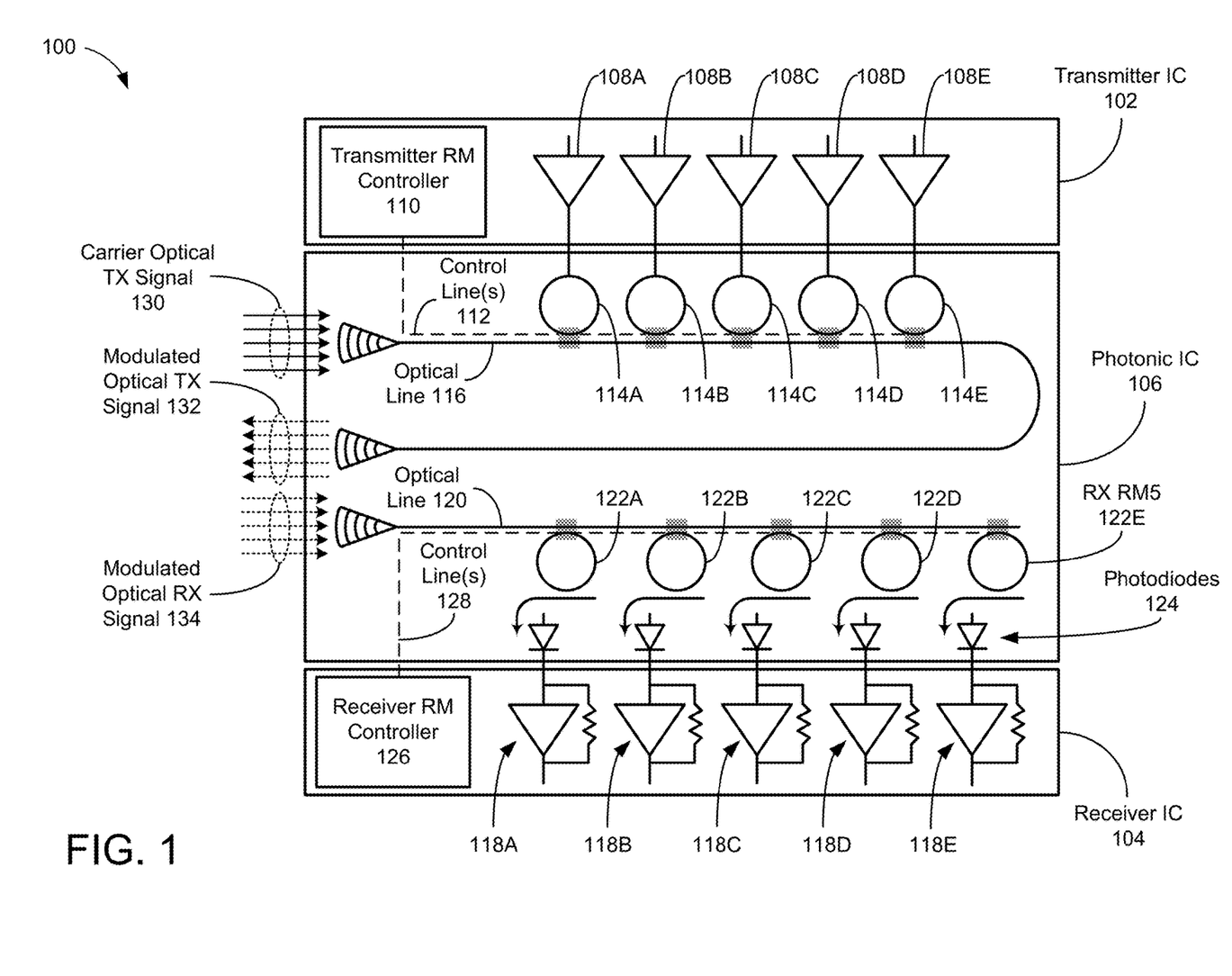
FIG. 1 is a block diagram of an optical transceiver including one or more ring modulators (RMs).

FIG. 1 is a block diagram of an example optical transceiver 100. In some example implementations, the optical transceiver 100 may be a 5×25 Gbps WDM transceiver. However, other suitable configurations for an optical transceiver are also contemplated, and the present disclosure should not be limited to the illustrated example.

The optical transceiver 100 includes a transmitter integrated circuit (IC) 102, a receiver IC 104, and a photonic IC 106. The transmitter IC 102 includes transmit (TX) buffers 108A-108E for five separate transmit channels. Each of the TX buffers 108A-108E may be coupled to a corresponding TX ring modulator (RM) 114A-114E (included in the photonic IC) and is responsible for providing data to the respective RM for transmission via an optical signal. The TX RMs 114A-114E also may be coupled to an optical line 116, and the optical line 116 may provide a carrier optical TX signal 130 that may be used (e.g. modulated) to carry the data signals received from the TX buffers 108A-108E. For example, each of the TX RMs 114A-114E may be configured to modulate data from a corresponding one of the TX buffers 108A-108E onto a different frequency portion of the carrier optical TX signal 130 to generate the modulated optical TX signal 132. The transmitter IC 102 may include a transmitter RM controller 110 configured to control operation of the TX RMs 114A-114E via one or more control lines 112.

On the receive (RX) side of the optical transceiver 100, the photonic IC 106 also may include RX RMs 122A-122E coupled to an optical line 120 that receives a modulated optical RX signal 134. The photonic IC 106 may further include a respective photodiode 124 for each of the RX RMs 122A-122E. The receiver IC 104 includes RX buffers 118A-118E. Each photodiode 124 is configured to convert the optical signal, demodulated by the corresponding RX RM, to a corresponding electrical RX data signal and provide the electrical RX data signal to a respective one of the RX buffers 118A-118E. Any suitable photodiode may be used, including (but not limited to) an avalanche photodiode (APD). The receiver IC 104 may further include a receiver RM controller 126 configured to control operation of the RX RMs 122A-122E via one or more control lines 128.

Figure 2:
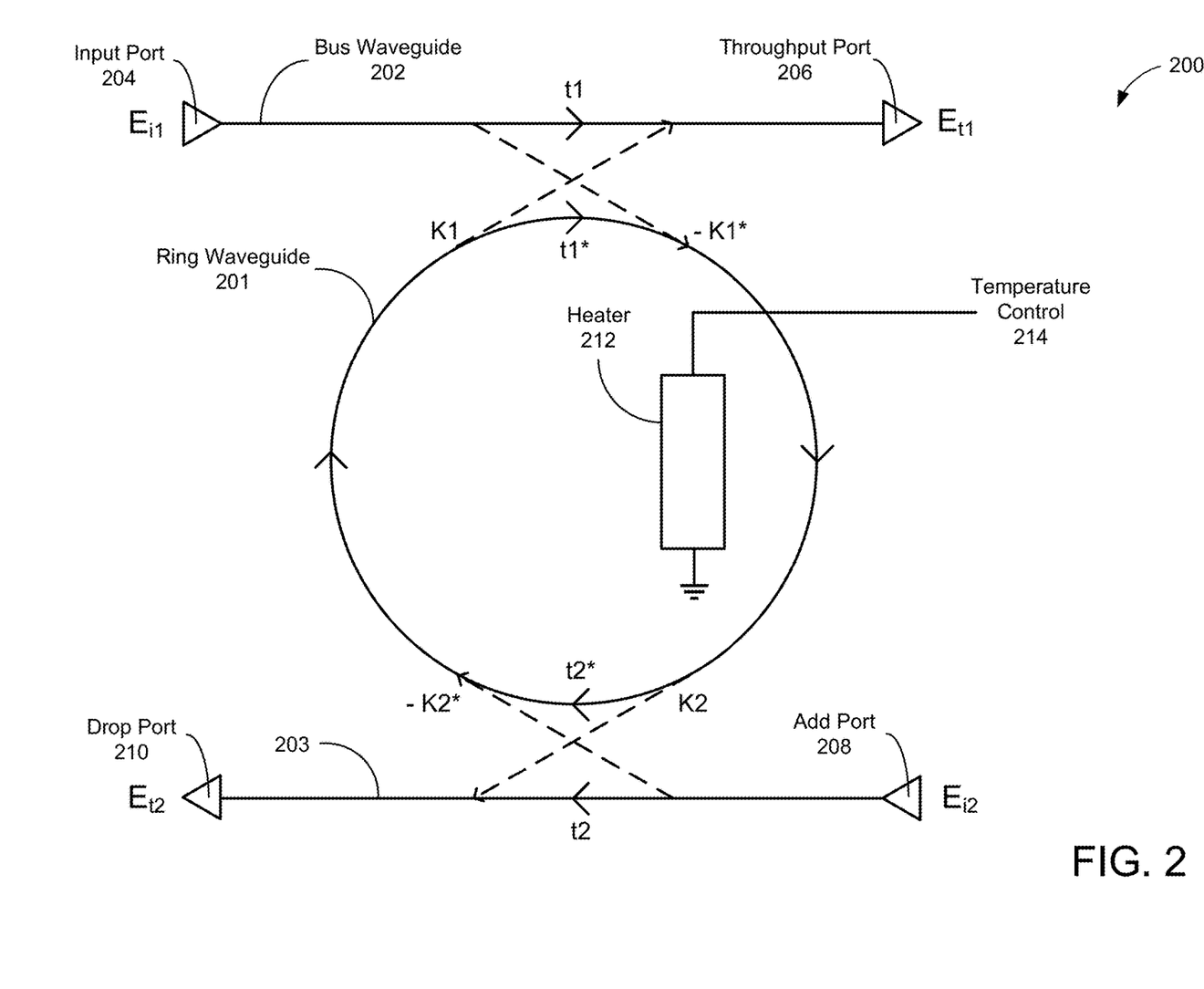
FIG. 2 is a depiction of an example RM.

FIG. 2 shows an example ring modulator (RM) 200. The RM 200 may be an example implementation of any of the RX RMs 122A-122E of FIG. 1. The RM 200 includes a ring waveguide 201 and a bus waveguide 202. The ring waveguide 201 may be optically coupled to the bus waveguide 202, where K1 indicates the coupling coefficient between the two waveguides 201 and 202 (and K1* indicating the complementary coupling coefficient). In this manner, the RM 200 may be configured to receive an optical signal Eur via the input port 204 of the bus waveguide 202 and separate a portion of the optical signal $E_{i1}$ (such as a particular optical wavelength) via the ring waveguide 201. The separate portion of $E_{i1}$ may be included in an optical signal $E_{t2}$ produced at a drop port 210. K2 may indicate the coupling coefficient for the RM 200 and an optical signal line 203 that includes an add port 208 and the drop port 210 (and K2* indicating the complementary coupling coefficient). The remaining portions of the optical signal ($E_{t1}$) exit the RM 200 via the throughput port 206 of the bus waveguide 202. The self-coupling coefficients t1 and t2 of the bus waveguide 202 and optical signal line 203, respectively, are also shown in FIG. 2.

In one example, if the RM 200 is configured for a wavelength range of $\lambda_3$, and the received optical signal $E_{i1}$ includes signals in wavelength ranges $\lambda_1, \lambda_2, \lambda_3, \lambda_4$, and $\lambda_5$, the throughput optical signal $E_{t1}$ may include the signals in wavelength ranges $\lambda_1, \lambda_2, \lambda_4$, and $\lambda_5$, but not the signal in wavelength range $\lambda_3$. The optical signal in wavelength range $\lambda_3$ is picked up by the ring waveguide 201 and included in the optical signal $E_{t2}$ at drop port 210. In some example implementations, the add port 208 may be used to introduce at least a portion of an optical signal E12 to the throughput signal $E_{t1}$ (and possibly another portion to the optical signal $E_{t2}$). For example, if the optical signal $E_{t2}$ is a signal within a suitable wavelength range $\lambda_4$, the optical signal $E_{t2}$ may be combined with the remaining signals in $E_{i1}$ so that the resulting optical signal $E_{t1}$ includes signals within wavelength ranges $\lambda_1, \lambda_2, \lambda_4, \lambda_5$, and $\lambda_4$. In some other example implementations, the add port 208 is not used.

The amplitude of transmission for a single pass of an optical signal through the ring waveguide 201 (which includes propagation loss in the ring waveguide 201 and coupling loss based on features of the coupling between the waveguides) may be represented by a value $\alpha$. Further, the ring waveguide 201 may have a propagation constant $\beta$ and a circumference L, and a value $\theta$ may be defined as in equation 1 below:

$$\theta = \beta * L \qquad (1)$$

Therefore, the optical signal $E_{t2}$ at the drop port 210 may be defined as in equation 2 below:

$$E_{t2} = \frac{-K_1^* K_2 \alpha_{1/2} e^{j\theta_1/2}}{1 - t_1^* t_2^* \alpha e^{j\theta}} \qquad (2)$$

In some examples, the average power of the optical signal at the drop port 210 may be approximately one percent to ten percent of the average power of the optical signal at the throughput port 206. While an example of a bilateral, single-ring RM is illustrated to show an example signal at the drop port of the RM, any suitable RM may be used with the optical signal at the drop port defined. For example, a double ring resonator may be used.

The operation of an RM includes jitter that may affect the timing of the optical signal at the drop port, and the amount of jitter may depend on changes in environmental temperature for the RM. In one example observation of an RM with a fixed laser wavelength of 1310 nanometers (nm) and operating at approximately 25 degrees Celsius with and without temperature variation, the jitter on the output of an RM with no variation in environmental temperature is measured at 323 femtoseconds (fsec), and the jitter on the output of an RM with a variation in environmental temperature of 0.017 degrees Celsius is measured at 418 fsec (a 29 percent increase).

Figure 3A:
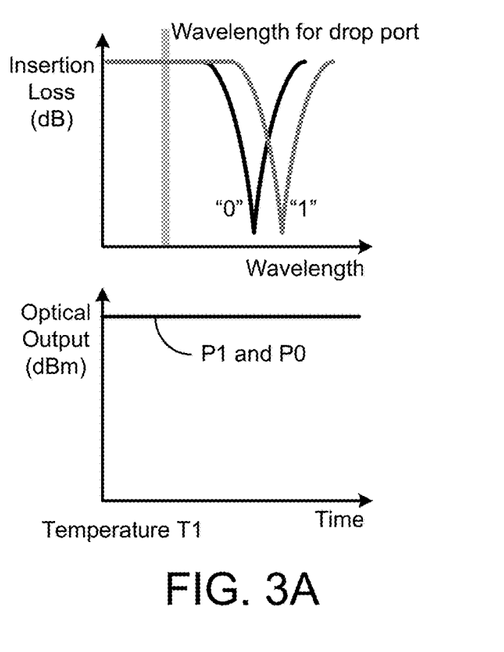
FIG. 3A is a depiction of an example optical swing for an environmental temperature T1 for an operating RM.
Figure 3B:
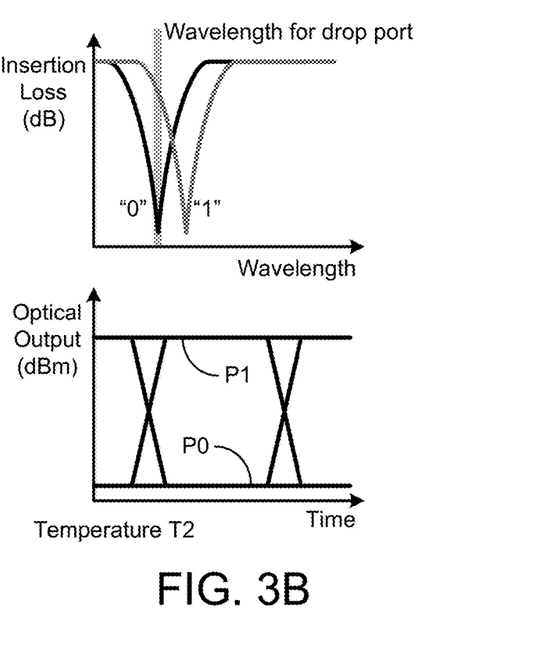
FIG. 3B is a depiction of an example optical swing for an environmental temperature T2 for the operating RM.
Figure 3C:
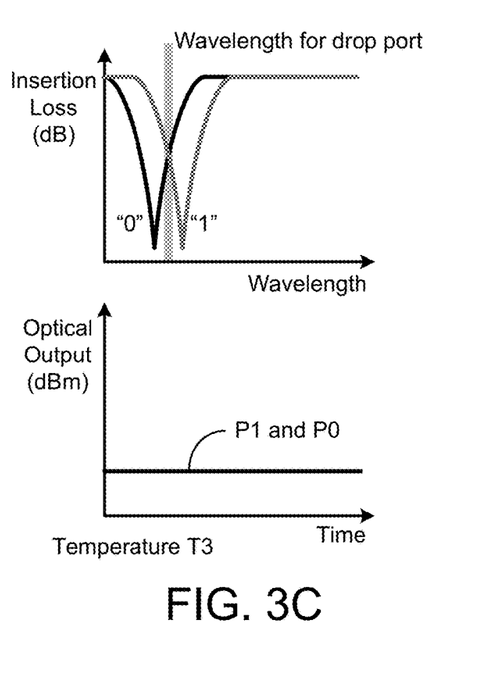
FIG. 3C is a depiction of an example optical swing for an environmental temperature T3 for the operating RM.
Figure 3D:
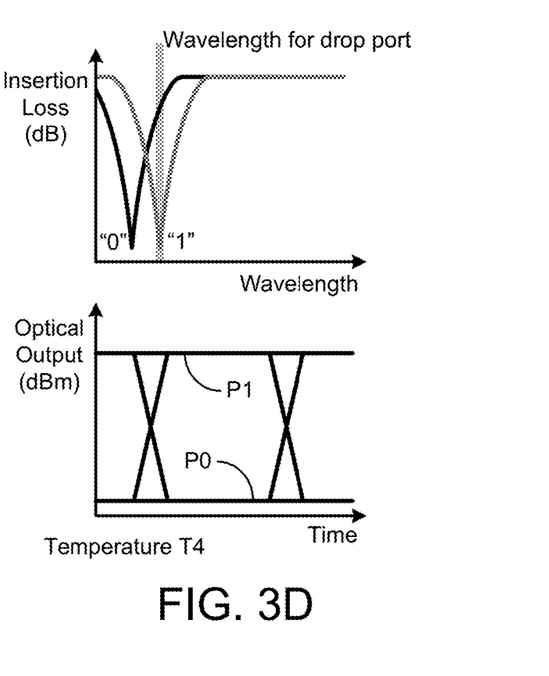
FIG. 3D is a depiction of an example optical swing for an environmental temperature T4 for the operating RM.

Further, the environmental temperature of an RM may affect the magnitude of the optical swing (i.e., the difference in power ratios between transmission of a 0 and transmission of a 1 by an optical signal). The optical swing may need to be of sufficient magnitude (such as greater than a threshold) for a circuit to differentiate between a 0 and a 1 being transmitted by the optical signal. FIGS. 3A-3D are depictions of example optical swings for corresponding environmental temperatures T1-T4 for an operating RM (where T1>T2>T3>T4). The wavelength of the optical signal at the drop port for transmission is illustrated by the gray band in FIGS. 3A-3D. The optical swing for the optical signal at the drop port is the magnitude of the difference between the power ratio P1 (for transmitting a "1") and the power ratio P0 (for transmitting a "0"). As shown in FIGS. 3A-3D, the environmental temperature affects the wavelengths of the optical signal for a transmitted "0" and "1." For temperature T1 (FIG. 3A), the optical swing is 0 (P1=P0). Similarly, for temperature T3 (FIG. 3C), the optical swing is 0 (P1=P0). FIGS. 3B and 3D indicate that temperatures T2 and T4 correspond to a maximum optical swing. Thus, the temperatures T2 and T4 may represent optimal temperatures in which to operate the RM.

In some example implementations, an RM may be calibrated to operate at a specific environmental temperature (such as at temperatures T2 or T4 in the example of FIGS. 3A-3D). For example, the environmental temperature of an RM may be adjusted at startup of the RM. An RM may include a heater disposed close to the ring to counter changes in environmental temperatures (e.g., for calibrating the RM). Referring back to FIG. 2, a heater 212 (which may include one or more heating elements) may be disposed in the ring waveguide 201 or in close proximity to the RM 200. The amount of heat from the heater 212 may be controlled via a temperature control signal 214, which may be provided by a corresponding RM controller (such as the Transmitter RM Controller 110 or the Receiver RM Controller 126 in FIG. 1). In some example implementations, the heater 212 includes one or more resistors coupled to a ground potential, and the temperature control signal 214 is a current supplied to the one or more resistors. In this manner, the amount of heat emitted by the resistor(s) may be decreased or increased based on a corresponding decrease or increase of current to the resistor(s).

Figure 4:
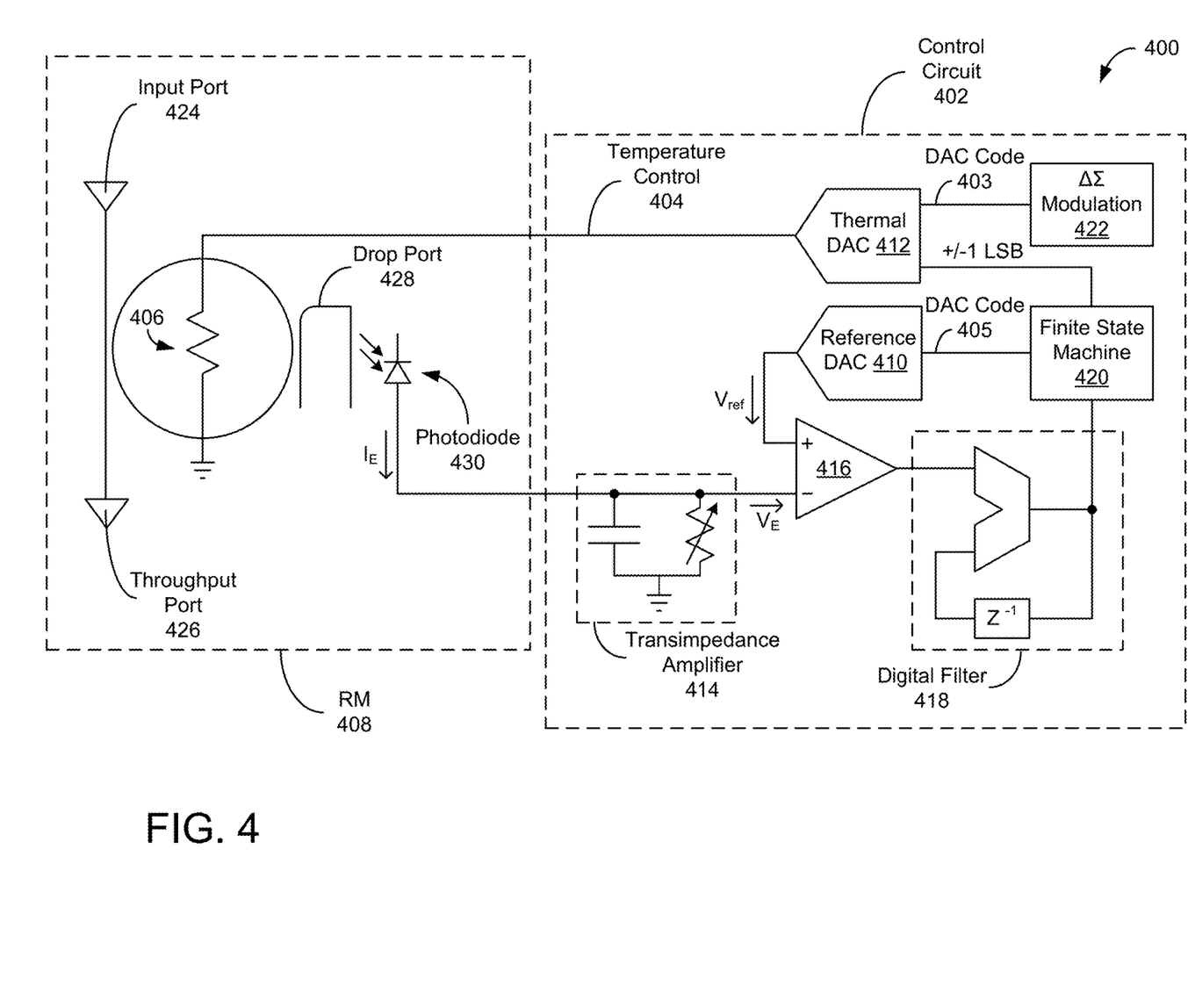
FIG. 4 is a depiction of an example control circuit for determining and providing a temperature control to a heater of an RM.

FIG. 4 shows an example receiver 400 of an optoelectrical communication system. The receiver 400 includes a ring modulator (RM) 408 and a control circuit 402. In calibrating the RM 408, a current corresponding to a temperature for a sufficient optical swing may be determined. In the example of FIG. 4, the control circuit 402 may determine and provide a temperature control signal 404 (such as a current) to a heater 406 (such as a resistor) of an RM 408. While the heater 406 is depicted as a resistor in the example of FIG. 4, any suitable heating device or circuit may be used in actual implementations.

The RM 408 includes an input port 424, a throughput port 426, a drop port 428, and a photodiode 430. The input port 424 is configured to receive an optical signal, the throughput port 426 is configured to pass at least a portion of the optical signal through the RM 408 (such as to other RMs corresponding to other portions of a receiver), and the drop port 428 is configured to provide the portion of the optical signal to be received by a corresponding portion of the receiver 400. The photodiode 430 (which may be one or more photodiodes) may be configured to convert the optical signal at the drop port 428 to an electrical signal (IE). The electrical signal IE may be an analog signal with varying levels of current based on the intensity of the optical signal at the drop port 428. In some implementations, the electrical signal IE may be provided to the control circuit 402. For example, the RM 408 may be an integrated circuit (IC) coupled to and providing the electrical signal IE to the control circuit 402 (which may also be an IC).

The control circuit 402 may include a reference digital-to-analog converter (DAC) 410, a thermal DAC 412, a transimpedance amplifier 414, a comparator 416, a digital filter 418, a finite state machine 420, and a delta-sigma (ΔΣ) modulator 422. The transimpedance amplifier 414 may be configured to convert the electrical signal IE to a corresponding voltage ($V_E$). The ΔΣ modulator 422 may generate a pre-defined Digital to Analog (DAC) code 403 to be converted to the temperature control signal 404 via the thermal DAC 412. The control circuit 402 may thus be configured to increase or decrease the temperature control signal 404 by adding or subtracting one from the DAC code 403 (such as by increasing or decreasing the least significant bit of the DAC code 403 as determined by the finite state machine 420). In some implementations, the thermal DAC 412 may be configured to receive a 12-bit digital codeword as its input. The finite state machine 420 may determine whether to increase, decrease, or not alter the temperature control signal 404 based on the voltage $V_E$ from the transimpedance amplifier 414.

The finite state machine 420 may provide a reference DAC code 405 to the reference DAC 410. The reference DAC 410 may output a reference voltage $V_{REF}$ based on the reference DAC code 405. In some implementations, the reference DAC 410 may be configured to receive a 6-bit digital codeword as its input. The reference DAC code 405 may correspond to a preferred voltage level of the voltage $V_E$ (e.g., corresponding to the heater 406 emitting a preferred amount of heat for operation of the RM408). The reference DAC code 405 may be based on a specific environmental temperature for the RM 408 and previously measured values of the voltage $V_E$. For example, the comparator 416 may compare the previously-measured values of $V_E$ to the reference voltage $V_{REF}$. The output from the comparator 416 may be provided to an arithmetic logic unit (ALU) of the digital filter 418. The ALU may combine the output of the comparator 416 with a previous output of the ALU to produce the current ALU output. The digital filter 418 may filter the signal from the comparator 416 to be provided to the finite state machine 420, e.g., by smoothing or averaging the instantaneous output of the comparator 416.

If the voltage $V_E$ differs significantly from the reference voltage $V_{REF}$, the finite state machine 420 may provide a signal to the thermal DAC 412 to incrementally increase or decrease the temperature control 404 (such as increasing or decreasing the current). As a result, the environmental temperature for the RM 408 may increase or decrease so that the voltage $V_E$ from the transimpedance amplifier 414 may converge on average to the reference voltage $V_{REF}$. In this manner, the control circuit 402 may cause the temperature control signal 404 to converge to a desired temperature value.

It is noted that, for calibration of the RM 408, only an average drop port current may be detected. The control circuit 402 is not configured to insert test signals into the RM 408 for calibration, and as a result, the control circuit 402 may not determine optical swings of optical signal in the RM 408 for different temperature control signals provided to the heater 406. Therefore, while it is desirable to operate an RM with an optimal optical swing (such as a maximum or user-defined optical swing), the control circuit 402 is unable to insert test signals to determine optical swings and thus is locked into providing a pre-defined reference voltage for the comparator 416 which may or may not correspond to the optimal optical swing. Therefore, it may be desirable to insert one or more test signals into the RM 408, wherein an optimal reference voltage $V_{REF}$ and the corresponding temperature control signal 404 of the heater 406 may be determined to optimize the optical swing of the signal at the drop port 428 of the RM 408 during an operation mode.

Figure 5:
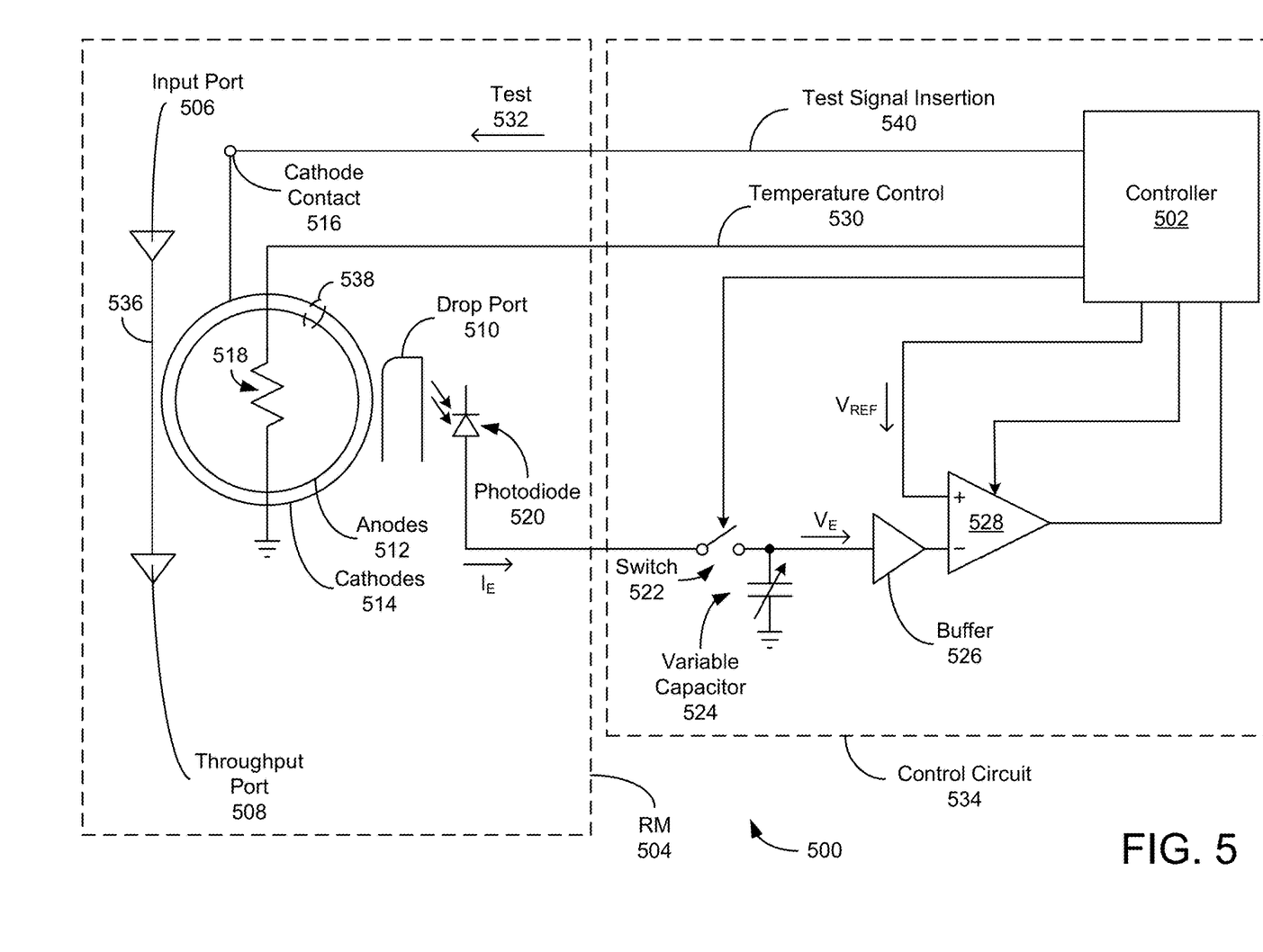
FIG. 5 is a depiction of another example control circuit for determining and providing a temperature control to a heater of an RM.

FIG. 5 shows another example receiver 500 of an opto-electrical communication system. The receiver 500 includes an RM 504 and a control circuit 534. The RM 504 may be an example implementation of an RM of the optical transceiver 100 in FIG. 1. In some implementations, the RM 504 includes a bus waveguide 536, a ring waveguide 538, a drop port 510, and a photodiode 520. The bus waveguide 536 includes an input port 506 and a throughput port 508. The ring waveguide 538 is optically coupled to the bus waveguide 536. The ring waveguide 536 includes a ring of anodes 512 and a ring of cathodes 514. In some example implementations, the ring of cathodes 514 may include or be coupled to one or more cathode contacts 516 that may be used to insert a signal to the ring waveguide 538. The cathode contact 516 is illustrated as outside the ring waveguide 538 for simplicity purposes, but the one or more cathode contacts 516 may have any suitable orientation related to the ring waveguide 538. For example, the cathode contact 516 may be an electrically conductive ring connected to the cathodes 514 via spokes from the electrically conductive ring to the cathodes 514. The RM 504 may further include a heater 518, which may be disposed within the ring waveguide 538 or in close proximity to the ring waveguide 538 or RM 504. While the heater 518 is depicted as a resistor in the example of FIG. 5, any suitable heating device or circuit may be used in actual implementations.

The input port 506 is configured to receive an optical signal, and the throughput port 508 is configured to pass at least a portion of the optical signal through the RM 504 (such as to other RMs corresponding to other portions of a receiver). The cathode contact 516 is configured to receive a test signal 532 from one or more test signal insertion lines 540 of the control circuit 534, and the test signal 532 may be inserted into the ring waveguide 538. The drop port 510 may be optically coupled to the ring waveguide 538, and the drop port 510 is configured to provide the portion of the optical signal to be received by a corresponding portion of a receiver or a test signal 532 inserted via the cathode contact 516 into the ring waveguide 538. The photodiode 520 (which may be one or more photodiodes) may be configured to convert the optical signal at the drop port 510 to an electrical signal (IE). In some implementations, the electrical signal IE may be provided to the control circuit 534. For example, the RM 504 may be an integrated circuit (IC) coupled to and providing the electrical signal IE to the control circuit 534 (which may also be an IC).

The control circuit 534 may be configured to determine a temperature control signal 530 corresponding to an optimal optical swing of the optical signal at the drop port 510 during an operation mode of the RM 504. The control circuit 534 may include a controller 502, a comparator 528, a buffer 526, a variable capacitor 524, and a switch 522. The controller 502 may be configured to provide one or more test signals 532 via the test signal insertion lines 540 to the cathode contact. The test signals 532 may be used in determining an optical swing for different temperature control signals 530, and thus in selecting a final or operating temperature control signal to be provided to the heater 518 during an operation mode of the RM 504. In providing a temperature control signal to the heater 518, the control circuit 534 may adjust the temperature of the heater 518 (i.e., cause the heater 518 to emit more or less heat), and the temperature of the RM 504 may be adjusted as a result.

Determining the final temperature control signal 530 by the controller 502 may include determining the reference voltage $V_{REF}$ for the optimal optical swing and the corresponding temperature control signal 530 for the determined reference voltage $V_{REF}$. A test signal 532 provided to the RM 504 may be inserted into the ring waveguide 538 via the cathode contact 516, and the optical signal at the drop port 510 with the test signal 532 inserted may be converted by the photodiode 520 to the current IE.

The controller 502 may also be configured to close the switch 522 to enable calibration of the RM 504. A converter, such as the variable capacitor 524, is configured to convert the current IE to a voltage $V_E$, which may be buffered by buffer 526 before being providing to comparator 528. The comparator 528 may then compare $V_E$ and $V_{REF}$ (provided by the controller 502), and provide the comparison result to the controller 502. Once calibration is completed (such as a final temperature control signal 530 being determined), the controller 502 may open the switch 522, and the determined temperature control signal 530 may be used for an operation mode of the RM 504. In some example implementations, the temperature control signal 530 may be a current from a range of discrete current levels.

The controller 502 may be further configured to control the comparator 528. For example, the controller 502 may control when the comparator 528 is to perform a comparison and provide the comparison results to the controller 502. The comparison results may be used by the controller 502 during calibration of the RM 504 to determine if $V_{REF}$ is to be adjusted and/or if the temperature control signal 530 for $V_{REF}$ is to be adjusted. In contrast to the control circuit 402 in FIG. 4, insertion of one or more test signals 532 into the RM 504 allows the controller 502 to determine optical swings for different temperature control signals 530 and $V_{REF}$ values. As a result, the controller 502 may be configured to determine an optimal $V_{REF}$ value (corresponding to an optimal optical swing) for determining a final temperature control signal 530 to be applied to the heater 518 during an operation mode of the RM 504.

For example, the controller 502 may be configured to adjust the temperature control signal 530 and $V_{REF}$ for one or more test signals 532 (inserted via the cathode contact 516). In this manner, an optical swing may be determined for each of a plurality of $V_{REF}$ values. Therefore, the controller 502 may select the $V_{REF}$ value corresponding to an optimal optical swing as compared to the optical swings for other $V_{REF}$ values, and the controller 502 may determine a temperature control signal 530 corresponding to the determined $V_{REF}$ value.

The controller 502 may be implemented as a combination of analog and digital components. Further, the controller 502 may include hardware, software, or a combination of both hardware and software. For example, the controller 502 may include one or more digital signal processors (DSPs) for calibration of the RM 504. The controller 502 may also include a memory for storing corresponding reference voltages, temperature controls and/or optical swings. For example, the memory may include a mapping associating a candidate reference voltage $V_{REF}$, a corresponding current level that may be provided to the heater 518, and a corresponding optical swing for the candidate reference voltage $V_{REF}$ and current level (determined using one or more test signals 532 inserted into the RM 504). The memory may include a mapping for each candidate reference voltage $V_{REF}$ in calibrating the RM 504. Such mapping may be used by one or more DSPs of the controller 502 to determine the final $V_{REF}$ and a corresponding current level (as the temperature control signal 530 to be provided to the heater 518), and the current may be supplied to the heater 518 during an operation mode of the RM 504.

Figure 6:
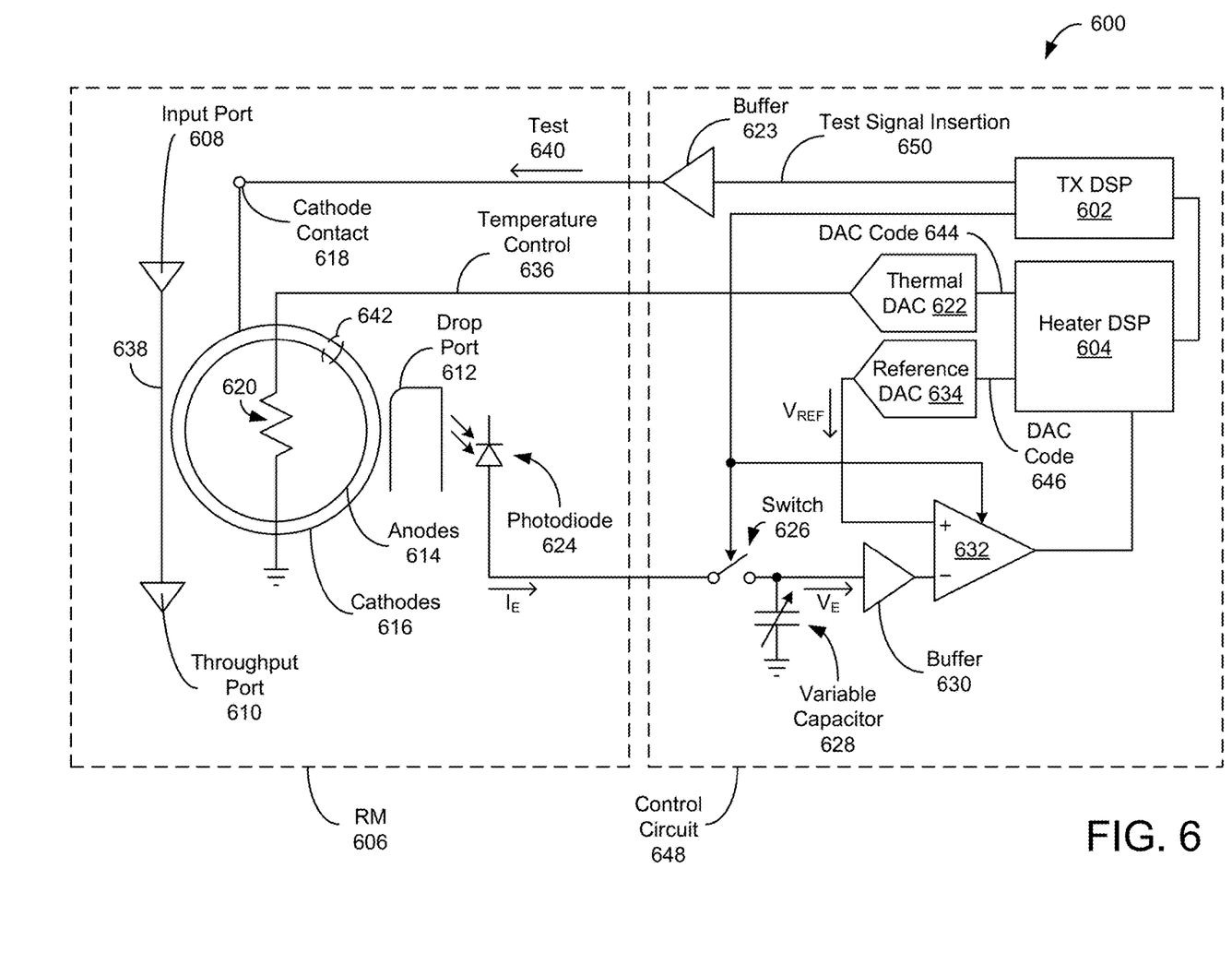
FIG. 6 is a depiction of an example implementation of the control circuit in FIG. 5.

FIG. 6 shows an example receiver 600 of an optoelectrical communication system. The receiver 600 includes an RM 606 and a control circuit 648. The RM 606 may be similar to the RM 504 in FIG. 5, and the control circuit 648 may be an example implementation of the control circuit 534 in FIG. 5. The RM 606 includes a bus waveguide 638, a ring waveguide 642 optically coupled to the bus waveguide 638, a drop port 612 optically coupled to the ring waveguide 642, and a photodiode 624 (which may be one or more photodiodes). The bus waveguide 638 may include an input port 608 to receive an optical signal provided to the RM 606 and a throughput port 610 to provide a portion of the received optical signal to other RMs of the receiver 600. The ring waveguide 642 may include a ring of anodes 614 and a ring of cathodes 616. The ring of cathodes 616 may include or be coupled to one or more cathode contacts 618, and the cathode contact 618 may receive test signals 640 via one or more test signal insertion lines 650 of the control circuit 648 during calibration of the RM 606. The photodiode 624 converts the optical signal from the drop port 612 to a current IE.

The control circuit 648 may include a TX DSP 602, a heater DSP 604, a thermal DAC 622 and a reference DAC 634 coupled to the heater DSP 604, a comparator 632, a buffer 630, a converter (such as a variable capacitor 628) and a switch 626. The control circuit 648 may be configured to receive the current IE from the RM 606, and the variable capacitor 628 of the control circuit 648 may convert the IE to an average voltage $V_E$ during calibration of the RM 606.

The switch 626 may be closed when the RM 606 is to be calibrated, and the switch 626 may be open when calibration is complete. The TX DSP 602 may control whether the RM 606 is in a calibration mode or an operation mode (e.g., via opening or closing the switch 626). The TX DSP 602 may be configured to provide the one or more test signals 640 (which may be buffered by a buffer 623) to the RM 606 via one or more test signal insertion lines during a calibration mode. The test signals 640 may be inserted into the ring waveguide 642 of the RM 606 via the cathode contact 618. The TX DSP 602 may also control when the comparator 632 is to compare the voltage $V_E$ and a reference voltage $V_{REF}$ from the reference DAC 634.

The heater DSP 604 may be configured to provide a thermal DAC code 644 corresponding to the temperature control signal 636 to the thermal DAC 622. The thermal DAC 622 may convert the thermal DAC code 644 to the temperature control signal 636. The temperature control signal 636 may be a current provided to the heater 620 of the RM 606. In some example implementations, each thermal DAC code 644 corresponds to a different current level to be supplied to a resistor (as an example heater 620). The heater DSP 604 may also be configured to provide a reference DAC code 646 corresponding to a reference voltage $V_{REF}$ for comparison with $V_E$ by the comparator 632. The reference DAC 634 may convert the reference DAC code 646 to $V_{REF}$ and provide $V_{REF}$ to the comparator 632. In some example implementations, the reference DAC code 646 may be 8 bits, corresponding to 256 different voltage levels for $V_{REF}$. However, any suitable number of bits for the reference DAC code 646 may be used. In some example implementations, the thermal DAC code 644 may be 63 bits, but any suitable number of bits for the thermal DAC code 644 may be used. In general, any suitable range of current levels may be used for the temperature control signal 636, and any suitable range of voltage levels may be used for $V_{REF}$. The TX DSP 602 and the heater DSP 604 may also be coupled to and communicate with each other. For example, the heater DSP 604 may communicate to the TX DSP 602 when to adjust the test signal 640, when to place the RM 606 in a calibration mode (e.g., by closing the switch 626), or when to cause the comparator 632 to compare $V_{REF}$ and $V_E$.

The control circuit 648 may determine the final $V_{REF}$ and the corresponding temperature control signal 636 during calibration. The final $V_{REF}$ may correspond to the optimal optical swing, as determined using the test signals 640. For example, the heater DSP 604 may determine the reference DAC code 646 and the corresponding thermal DAC code 644 corresponding to the optimal optical swing. In some example implementations, the control circuit 648 may determine an optical swing for each candidate reference voltage $V_{REF}$, compare the optical swings, and select the reference voltage $V_{REF}$ with the largest corresponding optical swing. The control circuit 648 may also determine the corresponding temperature control signal 636 for each candidate reference voltage $V_{REF}$, with the temperature control signal 636 corresponding to the selected reference voltage $V_{REF}$ to be provided to the heater 620 during an operation mode of the RM 606. For example, the heater DSP 604 may determine, for each candidate reference DAC code 646, a thermal DAC code 644 that causes $V_E$ to approximately equal the reference voltage $V_{REF}$. The heater DSP 604 may then apply one or more test signals 640 to determine an optical swing of a signal at the drop port 612 for the candidate reference DAC code 646 and corresponding thermal DAC code 644. The heater DSP 604 may then compare the optical swings corresponding to the candidate reference DAC codes 646, and select the thermal DAC code 644 corresponding to the optimal optical swing.

In determining an optical swing of a signal at the drop port 612 using test signals, it is noted that the optical signal passing through the RM 606 during an operation mode may be approximately DC-balanced. In other words, the number of "0's" may approximately equal the number of "1's" passing through the RM 606. In calibrating the RM 606, the control circuit 648 may determine the reference voltage $V_{REF}$ and the temperature control signal 636 corresponding to the reference voltage $V_{REF}$ by using a test signal 640 that is DC-balanced. For example, the TX DSP 602 may insert a DC-balanced test signal 640 of a repeating pattern of "01" (such as "0101010101 . . ."). Other suitable DC-balanced test signals may also be used (such as "11001100 . . .", "000111000111 . . .", etc.). Further, while a DC-balanced test signal is used in the examples, a suitable non-DC balanced test signal may be used.

Other than a DC-balanced test signal 640, a test signal 640 may mimic the optical signal being all "1's" (the test signal being "11111 . . ." and referred to as a high test signal) or the optical signal being all "0's" (the test signal being "00000 . . ." and referred to as a low test signal). The control circuit 648 may determine the optical swing for a reference voltage $V_{REF}$ and a temperature control signal 636 based on the $V_E$ for the high test signal and the $V_E$ for the low test signal. For example, the heater DSP may determine the optical swing as the difference between the $V_E$ for the high test signal and the $V_E$ for the low test signal, and the optimal optical swing may be the largest difference between the $V_E$ for the high test signal and the $V_E$ for the low test signal for all candidate $V_{REF}$ values.

Figure 7:
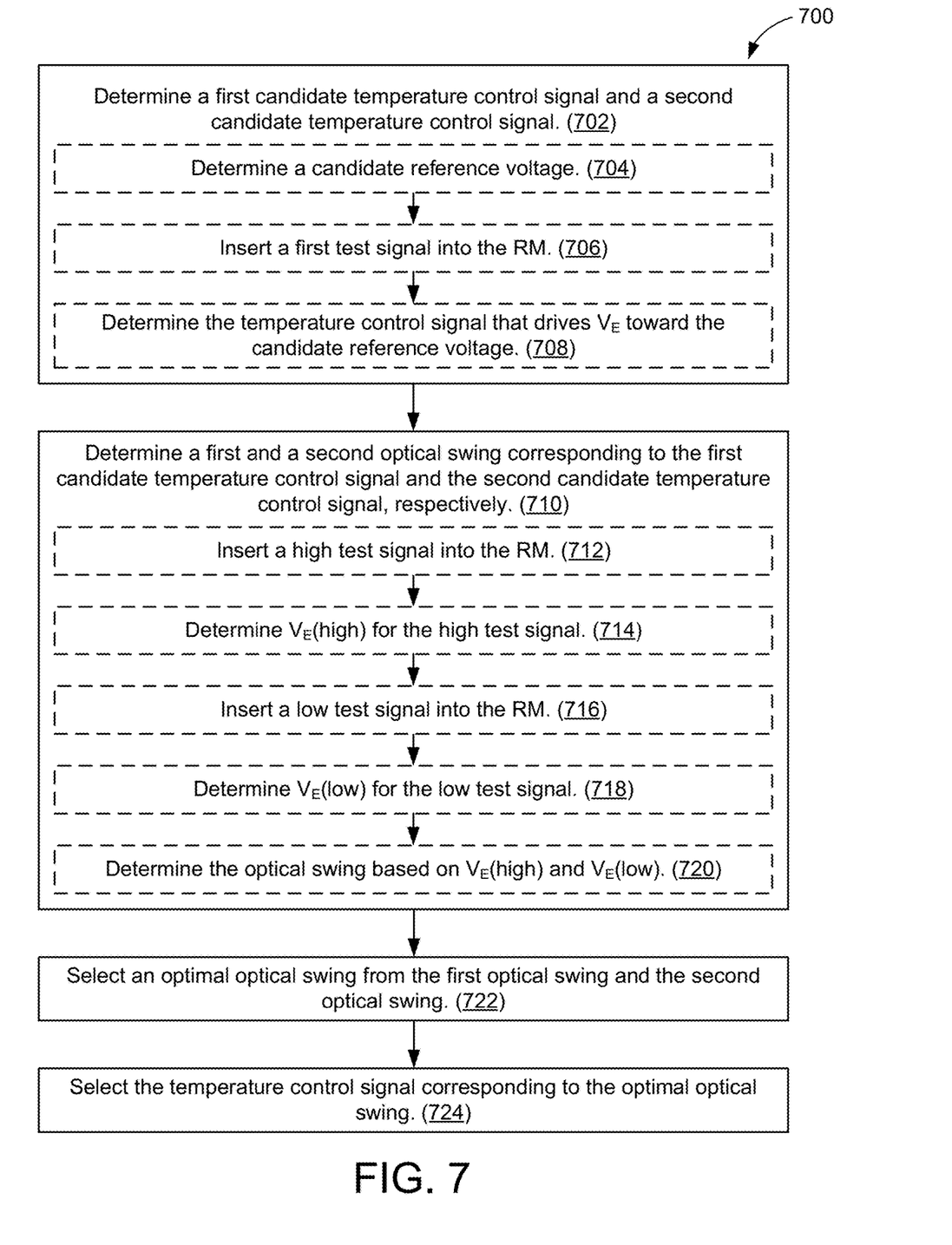
FIG. 7 is an illustrative flow chart depicting an example operation for determining a temperature control signal in calibrating an RM.

FIG. 7 is an illustrative flow chart depicting an example operation 700 for determining a temperature control signal to be provided to a heater of an RM during an operation mode. The temperature control signal is determined by determining optical swings for different candidate temperature control signals and selecting the candidate temperature control signal corresponding to the optimal optical swing. While the control circuit 648 in FIG. 6 is used in describing the example operation 700, any suitable control system may be used.

The control circuit 648 may determine a first and a second candidate temperature control signal 636 (702). In some implementations, each candidate temperature control signal may correspond to a separate candidate reference voltage $V_{REF}$. For example, for a DC-balanced test signal inserted into the RM 606, the first candidate temperature control signal for a first candidate $V_{REF}$ may cause $V_E$ to approximately equal the first candidate $V_{REF}$, and the second candidate temperature control signal for a second candidate $V_{REF}$ may cause $V_E$ to approximately equal the second candidate $V_{REF}$. Therefore, the first optical swing and the second optical swing correspond to the first candidate $V_{REF}$ and the second candidate $V_{REF}$, respectively. In some implementations, the control circuit may select a plurality of candidate $V_{REF}$, and then determine the corresponding temperature control signal for each candidate $V_{REF}$.

In some implementations, the control circuit 648 may determine a candidate temperature control signal 636 by first determining a candidate reference voltage $V_{REF}$ (704). For example, the heater DSP 604 may determine a candidate reference DAC code 646 from the range of possible reference DAC codes. The reference DAC 634 may convert the candidate reference DAC code 646 to the candidate reference voltage $V_{REF}$ to be received by the comparator 632.

In determining a candidate temperature control signal 636, the control circuit 648 may also insert a first test signal into the RM 606 (706). For example, the TX DSP 602 may provide the first test signal 640 to the RM 606 via one or more test signal insertion lines 650, and the first test signal 640 may be inserted into the ring waveguide 642. In this manner, the drop port 612 includes an optical signal corresponding to the first test signal, from which the photodiode 624 generates an IE that the converter converts to a $V_E$. The first test signal may be a DC-balanced signal. With the first test signal inserted into the RM 606, the control circuit 648 may determine the candidate temperature control signal 636 that drives $V_E$ toward the candidate reference voltage $V_{REF}$ (708). For example, the candidate temperature control signal 636 may be used to adjust the temperature of the heater 620. Adjusting the temperature of the heater 620 may cause the optical signal at the drop port 612 to change so that the corresponding $V_E$ is driven toward the candidate reference voltage $V_{REF}$. In some examples, the determined candidate temperature control signal 636 may cause $V_E$ to approximately equal the candidate reference voltage $V_{REF}$ (such as being $V_E$ being slightly less than $V_{REF}$).

The heater DSP 604 may provide a reference DAC code 646 for $V_{REF}$ and adjust the thermal DAC code 644 until the comparator 632 indicates that $V_E$ approximately equals $V_{REF}$. In some implementations of adjusting the thermal DAC code 644, the heater DSP 604 may initially set the thermal DAC code 644 to a maximum thermal DAC code, which causes $V_E$ for a DC-balanced test signal to be greater than the candidate $V_{REF}$. The heater DSP 604 may then decrement the thermal DAC code (thus decreasing the temperature control signal 636) until $V_E$ is less than the candidate $V_{REF}$ (as indicated by the results of the comparison from the comparator 632). To determine another candidate $V_{REF}$, the heater DSP 604 may adjust the reference DAC code 646, and the heater DSP 604 may determine the thermal DAC code 644 corresponding to the adjusted reference DAC code 646. In this manner, a first candidate temperature control signal corresponds to a first candidate $V_{REF}$, and a second candidate temperature control signal corresponds to a second candidate $V_{REF}$ different from the first candidate $V_{REF}$.

The control circuit 648 may determine a first optical swing for the first candidate temperature control signal, and the control circuit 648 may determine a second optical swing for the second candidate temperature control signal (710). The optical signal at the drop port 612 may have a high power ratio when a high signal exists on the drop port 612. For example, when the ring waveguide 642 receives an optical signal corresponding to a "1" (such as a high test signal inserted into the ring waveguide 642), the optical signal at the drop port 612 may be at the maximum power ratio for the temperature control signal 636 applied to the heater 620. In contrast, the optical signal at the drop port 612 may have a low power ratio when a low signal exists on the drop port 612. For example, when the ring waveguide 642 receives an optical signal corresponding to a "0" (such as a low test signal inserted into the ring waveguide 642), the optical signal at the drop port 612 may be at the minimum power ratio for the temperature control signal 636 applied to the heater 620. Therefore, the optical swing may indicate the difference between the maximum power ratio and the minimum power ratio.

In some implementations of determining an optical swing corresponding to a candidate temperature control signal (and the candidate reference voltage), the control circuit 648 may provide a high test signal to the RM 606, and the high test signal may be inserted into the RM 606 (712). For example, in determining a first optical swing, a first candidate temperature control signal 636 may be applied to the heater 620. The TX DSP 602 may provide a high test signal via the one or more test signal insertion lines 650, and the high test signal may be inserted into the ring waveguide 642 via the cathode contact 618.

Once the high test signal is inserted into the RM 606, the control circuit 648 may determine a measured voltage $V_E$ corresponding to the inserted high test signal ($V_E$(high)) (714). For example, an optical signal at the drop port 612 is a result of inserting the high test signal. The photodiode 624 generates a high current $I_E$(high) from the optical signal, and the variable capacitor 628 converts $I_E$(high) to the measured voltage $V_E$(high).

The TX DSP 602 may also provide a low test signal via the one or more test signal insertion lines 650, and the low test signal may be inserted into the ring waveguide 642 via the cathode contact 618 (716). Once the low test signal is inserted into the RM 606, the control circuit 648 may determine a measured voltage $V_E$ corresponding to the inserted low test signal ($V_E$(low)) (714). For example, an optical signal at the drop port 612 is a result of inserting the low test signal. The photodiode 624 generates a low current $I_E$(low) from the optical signal, and the variable capacitor 628 converts $I_E$(low) to the measured voltage $V_E$(low).

With $V_E$(high) and $V_E$(low) determined, the control circuit 648 may determine the first optical swing based on $V_E$(high) and $V_E$(low) (720). For example, the first optical swing may correspond to a difference between $V_E$(high) and $V_E$(low). An optical swing may be represented by a digital code, and the digital code may be stored with a corresponding thermal DAC code (for the candidate temperature control signal 636) and correlated to the candidate reference DAC code for the candidate $V_{REF}$. The control circuit 648 may include an analog-to-digital converter (ADC, not shown) coupled to the variable capacitor 628. The ADC may convert $V_{REF}$(high) to a digital $V_{HIGH}$ code and provide the $V_{HIGH}$ code to the heater DSP 604. The ADC may also convert $V_{REF}$(low) to a digital $V_{LOW}$ code and provide the $V_{LOW}$ code to the heater DSP 604. In some implementations, the heater DSP 604 may determine an optical swing to be the difference between the $V_{HIGH}$ code and the $V_{LOW}$ code, and the difference may be stored in the memory.

After the first and second optical swings are determined by the heater DSP 604, the control circuit 648 may select an optimal optical swing from the first optical swing and the second optical swing (722). In some implementations, the optimal optical swing is the largest optical swing. For example, the heater DSP 604 may compare the optical swings stored as digital codes in the memory, and the heater DSP 604 may select the largest digital code in the memory as the optimal optical swing.

The control circuit 648 may then select the temperature control signal corresponding to the optimal optical swing (724), and the selected temperature control signal may be provided by the heater DSP 604 during the operation mode of the RM 606. The memory storing the selected optimal optical swing may also store the corresponding thermal DAC code (which is associated with a reference DAC code). The heater DSP 604 may select the corresponding thermal DAC code stored in the memory, and the heater DSP 604 may provide the selected thermal DAC code 644 during an operation mode of the RM 606. The thermal DAC 622 may convert the thermal DAC code 644 and provide the selected temperature control signal 636 to the heater 620 during the operation mode of the RM 606.

If the optimal optical swing corresponds to the first candidate temperature control signal or the second candidate temperature control signal, the control circuit 648 may select the first candidate temperature control signal or the second candidate temperature control signal (such as selecting the corresponding thermal DAC code stored in the memory) as the operating temperature control signal 636 to be provided to the heater 620, and the RM 606 may be placed into an operation mode by opening switch 626. For example, the TX DSP 602 may open the switch 626 in response to receiving an indication from the heater DSP 604 that an operating temperature control signal for use during the operation mode is selected.

As previously noted, the first candidate temperature control signal and the second candidate temperature control signal correspond to different candidate reference voltages $V_{REF}$. For example, for a DC-balanced test signal inserted into the RM 606, the first candidate temperature control signal for a first candidate $V_{REF}$ may cause $V_E$ to approximately equal the first candidate $V_{REF}$, and the second candidate temperature control signal for a second candidate $V_{REF}$ may cause $V_E$ to approximately equal the second candidate $V_{REF}$. Therefore, the first optical swing and the second optical swing correspond to the first candidate $V_{REF}$ and the second candidate $V_{REF}$, respectively. In some implementations, the control circuit may select a plurality of candidate $V_{REF}$, determine the corresponding candidate temperature control signal for each candidate $V_{REF}$, and determine the corresponding optical swing for each candidate temperature control signal and $V_{REF}$.

In some implementations, the control circuit 648 may determine a candidate temperature control signal 636 and a corresponding optical swing for each candidate reference voltage $V_{REF}$. For example, if the reference DAC code includes 8 bits, a thermal DAC code 644 and optical swing may be determined for each reference DAC code 646 from 00000000 to 11111111 (i.e., 256 different reference DAC codes 646). The heater DSP 604 may sweep through each of the reference DAC codes 646 (e.g., from a maximum to a minimum) and determine a corresponding thermal DAC code 644 and optical swing.

Figure 8:
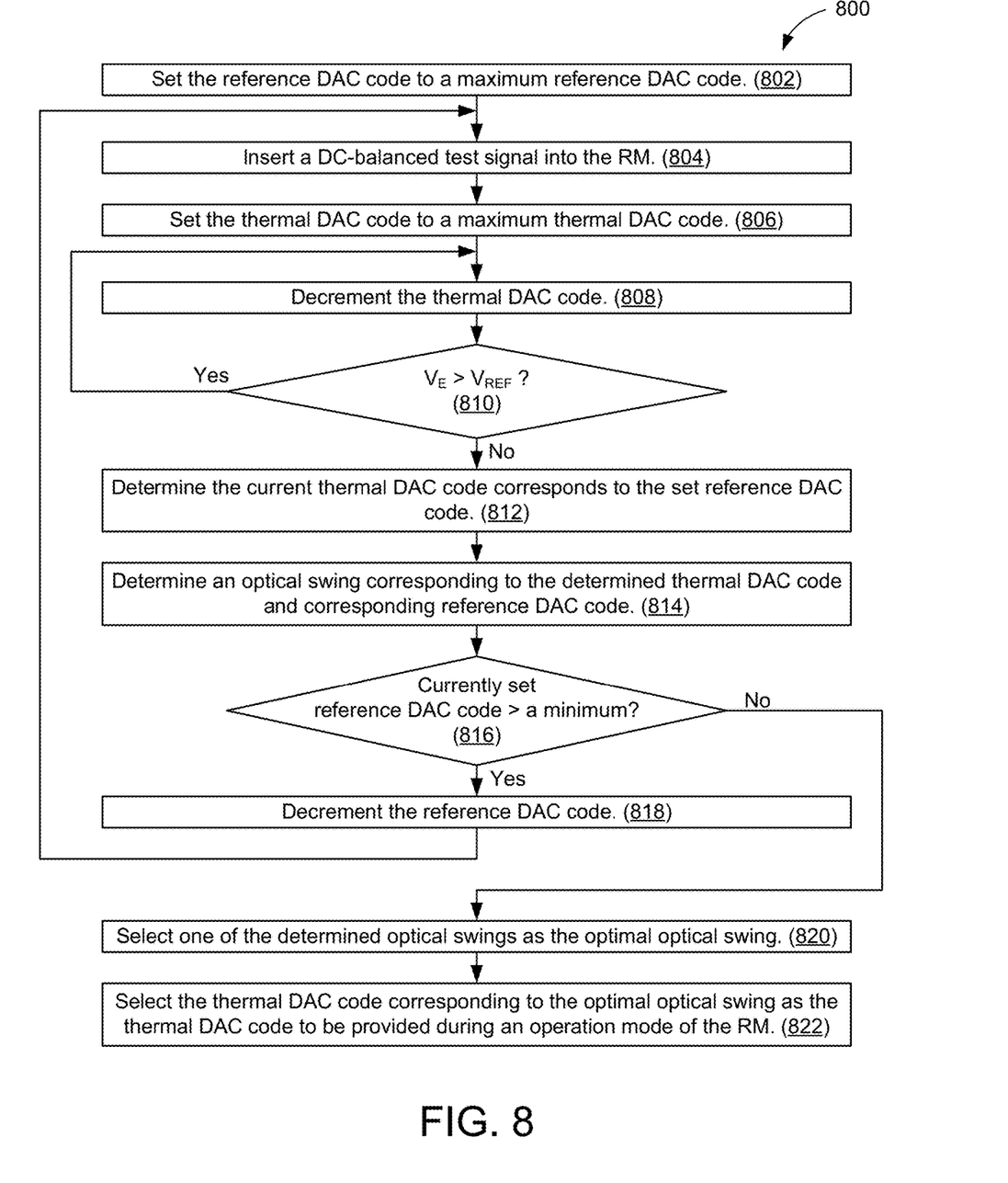
FIG. 8 is an illustrative flow chart depicting an example operation for calibrating an RM, including the control circuit sweeping through each reference digital-to-analog converter (DAC) code to determine an optimal optical swing and corresponding thermal DAC code.

FIG. 8 is an illustrative flow chart depicting an example operation 800 for calibrating the RM 606, in which the control circuit 648 sweeps through each reference DAC code 646 to determine an optimal optical swing and corresponding thermal DAC code 644. The heater DSP 604 may set the reference DAC code 646 to a maximum reference DAC code, which may correspond to a maximum candidate $V_{REF}$ (802). The TX DSP 602 may also provide a DC-balanced test signal 640 to the RM 606, and the DC-balanced test signal may be inserted into the RM 606 (804). With the reference DAC code 646 set, the heater DSP 604 may set the thermal DAC code 644 to a maximum thermal DAC code (806). The maximum thermal DAC code may correspond to a maximum temperature control signal 636 (such as a maximum current level to be supplied to the heater 620).

With A DC-balanced test signal inserted into the RM 606 and the thermal DAC code 644 set to a maximum, the comparator 632 may determine that $V_E$ for the test signal is greater than the candidate $V_{REF}$ corresponding to the set reference DAC code 646. The heater DSP 604 may receive the results of the comparison from the comparator 632, and the heater DSP 604 may decrement the thermal DAC code 646 (808).

If $V_E$ is still greater than $V_{REF}$ as indicated by the results of the comparison from the comparator 632 (810), the process may revert to step 808, and the heater DSP 604 may again decrement the thermal DAC code 644. If $V_E$ falls to less than $V_{REF}$, the heater DSP 604 determines the current thermal DAC code 644 as corresponding to the set reference DAC code 646 (812). The heater DSP 604 may then determine an optical swing corresponding to the determined thermal DAC code 644 and the corresponding reference DAC code 646 (814). Determining the optical swing may be as described above for steps 712-720 in FIG. 7. In some implementations, the heater DSP 604 may associate and store in a memory the determined optical swing and corresponding thermal DAC code 644 for the reference DAC code 646. The memory may be a local memory to the heater DSP 604. In one example, the memory may include a look-up table (LUT) with the number of entries equaling the number of possible reference DAC codes and each entry corresponding to a different reference DAC code. In another example, the memory may be configured to store the reference DAC code with the associated thermal DAC code and optical swing code.

After determining the optical swing, if the currently set reference DAC code 646 is greater than a minimum reference DAC code (816), the heater DSP 604 may decrement the currently set reference DAC code 646 (818). The process may then revert to step 804. In this manner, the heater DSP 604 may iteratively decrement the reference DAC code 646 through the range of possible reference DAC codes and determine a thermal DAC code 644 and corresponding optical swing for each of the possible reference DAC codes.

If the currently set reference DAC code 646 is at a minimum (as tested at 816), an optical swing and thermal DAC code 644 has been determined for each reference DAC code 646. Therefore, the heater DSP 604 may select one of the determined optical swings as the optimal optical swing (820). For example, if all of the optical swings are stored in the memory in or coupled to the heater DSP 604, the heater DSP 604 may compare the stored optical swings to determine the greatest optical swing. The heater DSP 604 may then select the thermal DAC code 644 corresponding to the optimal optical swing as the thermal DAC code 644 to be generated during an operation mode of the RM 606 (822).

In this manner, the selected thermal DAC code 644 is provided by the heater DSP 604 during the operation mode of the RM 606. The thermal DAC 622 converts the thermal DAC code 644 to the operating temperature control signal 636 and provides the signal to the heater 620 during the operation mode of the RM 606. The temperature of the heater 620 may therefore be adjusted using the operating temperature control signal to optimize the optical swing of the optical signal at the drop port 612 during the operation mode of the RM 606. In some implementations, the heater DSP 604 provides an indication to the TX DSP 602 that a thermal DAC code 644 is selected to end the calibration of the RM 606. As a result, the TX DSP 602 may open the switch 626 to place the RM 606 in the operation mode.

Calibration of the RM may occur at any suitable time or moment in operation. In one example, calibration may occur at startup of the RM. In another example, calibration may occur periodically, may be initiated by a user, or may be initiated by a change to external temperatures for an optical transceiver. Other suitable moments for calibrating the RM may exist, and calibrating the RM should not be limited to the provided examples.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. For example, while the comparator of the control circuit is described as comparing voltages, the comparator may be configured to compare other metrics (such as current) or signals for the RM.

The methods, sequences or algorithms described in connection with the aspects disclosed herein may be embodied directly in hardware, in a software module executed by a processor, or in a combination of the two. A software module may reside in RAM latch, flash latch, ROM latch, EPROM latch, EEPROM latch, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A system for calibrating a ring modulator, comprising:
   one or more test signal insertion lines configured to provide one or more test signals to a ring modulator during a calibration mode; and
   a controller configured to:
      provide a first test signal to the ring modulator via the one or more test signal insertion lines;
      determine a first candidate temperature control signal for a heater of the ring modulator when the first test signal is provided to the ring modulator;
      adjust a temperature of the heater using the first candidate temperature control signal;
      determine a first optical swing of an optical signal at a drop port of the ring modulator when the first candidate temperature control signal is provided to the heater;
      determine a second candidate temperature control signal for the heater when the first test signal is provided to the ring modulator;
      adjust the temperature of the heater using the second candidate temperature control signal;
      determine a second optical swing of an optical signal at the drop port when the second candidate temperature control signal is provided to the heater;
      select an optimal optical swing from the first optical swing and the second optical swing; and
      select one of the first candidate temperature control signal or the second candidate temperature control signal, based on the optimal optical swing, to be provided to the heater during an operation mode of the ring modulator.

2. The system of claim 1, wherein the controller is to select the first candidate temperature control signal to be provided to the heater when the optimal optical swing corresponds to the first optical swing, and wherein the controller is to select the second candidate temperature control signal to be provided to the heater when the optimal optical swing corresponds to the second optical swing.

3. The system of claim 1, wherein the first test signal is DC-balanced.

4. The system of claim 3, wherein the ring modulator includes a photodiode configured to generate a current from the optical signal at the drop port of the ring modulator, the system further comprising a converter configured to convert the current to a measured voltage.

5. The system of claim 4, wherein the controller is further configured to:
   in determining the first optical swing:
      provide a high test signal to the ring modulator, wherein the photodiode generates a first high current corresponding to the optical signal at the drop port when the high test signal is inserted into the ring modulator and the converter converts the first high current to a first high voltage;

provide a low test signal to the ring modulator, wherein the photodiode generates a first low current corresponding to the optical signal at the drop port when the low test signal is inserted into the ring modulator and the converter converts the first low current to a first low voltage; and determine the first optical swing based on a difference between the first high voltage and the first low voltage; and in determining the second optical swing:

provide the high test signal to the ring modulator, wherein the photodiode generates a second high current corresponding to the optical signal at the drop port when the high test signal is inserted into the ring modulator and the converter converts the second high current to a second high voltage;

provide the low test signal to the ring modulator, wherein the photodiode generates a second low current corresponding to the optical signal at the drop port when the low test signal is inserted into the ring modulator and the converter converts the second low current to a second low voltage; and determine the second optical swing based on a difference between the second high voltage and the second low voltage.

6. The system of claim 5, further comprising an analog-to-digital converter (ADC) configured to convert the first high voltage, the second high voltage, the first low voltage, and the second low voltage to a first digital code, a second digital code, a third digital code, and a fourth digital code, respectively, wherein:

the first optical swing is a difference between the first digital code and the third digital code;

the second optical swing is a difference between the second digital code and the fourth digital code; and the optimal optical swing is the largest from the first optical swing and the second optical swing.

7. The system of claim 6, wherein the controller includes a heater digital signal processor (DSP) configured to:

generate a first reference digital-to-analog converter (DAC) code corresponding to a first candidate reference voltage, wherein the temperature of the heater for the first candidate temperature control signal drives the measured voltage towards the first candidate reference voltage;

generate a second reference DAC code corresponding to a second candidate reference voltage, wherein the temperature of the heater for the second candidate temperature control signal drives the measured voltage towards the second candidate reference voltage;

generate a first thermal DAC code corresponding to the first candidate temperature control signal; and generate a second thermal DAC code corresponding to the second candidate temperature control signal.

8. The system of claim 7, wherein the controller further includes:

a thermal DAC configured to convert the first thermal DAC code to the first candidate temperature control signal and convert the second thermal DAC code to the second candidate temperature control signal; and a reference DAC configured to convert the first reference DAC code to the first candidate reference voltage and convert the second reference DAC code to the second candidate reference voltage.

9. The system of claim 8, wherein the controller further includes a transmit (TX) DSP configured to generate the first test signal, the high test signal, and the low test signal provided to the ring modulator.

10. The system of claim 9, further comprising a comparator configured to compare the measured voltage from the converter to a provided reference voltage from the reference DAC and provide results of the comparison to the heater DSP.

11. The system of claim 10, further comprising a memory coupled to or included in the heater DSP, wherein the heater DSP is further configured to:

store, in the memory, the first thermal DAC code and the first optical swing in association with the first reference DAC code;

store, in the memory, the second thermal DAC code and the second optical swing in association with the second reference DAC code; and compare the stored optical swings to select the optimal optical swing, wherein selecting one of the first candidate temperature control signal or the second candidate temperature control signal includes selecting the stored thermal DAC code corresponding to the optimal optical swing.

12. The system of claim 11, wherein the heater DSP is further configured to determine a corresponding thermal DAC code and optical swing for each reference DAC code by:

initializing the first reference DAC code to a maximum reference DAC code;

initializing the first thermal DAC code to a maximum thermal DAC code for the first reference DAC code;

iteratively decrementing the first thermal DAC code until the results from the comparator indicate that the measured voltage is less than the first candidate reference voltage;

iteratively decrementing the first reference DAC code and determining the corresponding thermal DAC code and optical swing at each iterative decrement, wherein at least one of the decremented first reference DAC codes is equal to the second reference DAC code; and associating and storing, in the memory, the corresponding thermal DAC code and optical swing for each decremented first reference DAC code.

13. The system of claim 12, further comprising a switch controlled by the TX DSP and coupling the photodiode of the ring modulator and the converter, wherein the switch is configured to:

place the ring modulator in the calibration mode when the switch is closed; and place the ring modulator in the operation mode when the switch is open, wherein the TX DSP is configured to open the switch in response to receiving an indication from the heater DSP that the first candidate temperature control signal or the second candidate temperature control signal is selected.

14. A method for calibrating a ring modulator, comprising:

providing, by a controller and during a calibration mode of the ring modulator, a first test signal to the ring modulator;

determining a first candidate temperature control signal for a heater of the ring modulator when the first test signal is provided to the ring modulator;

adjusting a temperature of the heater using the first candidate temperature control signal;

determining a first optical swing of an optical signal at a drop port of the ring modulator when the first candidate temperature control signal is provided to the heater;

determining a second candidate temperature control signal for the heater when the first test signal is provided to the ring modulator;

adjusting the temperature of the heater using the second candidate temperature control signal;

determining a second optical swing of an optical signal at the drop port when the second candidate temperature control signal is provided to the heater;

selecting an optimal optical swing from the first optical swing and the second optical swing; and selecting one of the first candidate temperature control signal or the second candidate temperature control signal, based on the optimal optical swing, to be provided to the heater during an operation mode of the ring modulator.

15. The method of claim 14, wherein:

the first test signal is DC-balanced;

the ring modulator includes a photodiode configured to generate a current from the optical signal at the drop port of the ring modulator; and the method further includes converting the current to a measured voltage by a converter.

16. The method of claim 15, wherein:

in determining the first optical swing:

providing, by the controller, a high test signal to the ring modulator, wherein the photodiode generates a first high current corresponding to the optical signal at the drop port when the high test signal is inserted into the ring modulator and the converter converts the first high current to a first high voltage;

providing, by the controller, a low test signal to the ring modulator, wherein the photodiode generates a first low current corresponding to the optical signal at the drop port when the low test signal is inserted into the ring modulator and the converter converts the first low current to a first low voltage; and determining the first optical swing based on a difference between the first high voltage and the first low voltage; and in determining the second optical swing:

providing, by the controller, the high test signal to the ring modulator, wherein the photodiode generates a second high current corresponding to the optical signal at the drop port when the high test signal is inserted into the ring modulator and the converter converts the second high current to a second high voltage;

providing, by the controller, the low test signal to the ring modulator, wherein the photodiode generates a second low current corresponding to the optical signal at the drop port when the low test signal is inserted into the ring modulator and the converter converts the second low current to a second low voltage; and determining the second optical swing based on a difference between the second high voltage and the second low voltage.

17. The method of claim 16, wherein determining the first optical swing and the second optical swing further comprises converting, by an analog-to-digital converter (ADC), the first high voltage, the second high voltage, the first low voltage, and the second low voltage to a first digital code, a second digital code, a third digital code, and a fourth digital code, respectively, wherein:

the first optical swing is a difference between the first digital code and the third digital code;

the second optical swing is a difference between the second digital code and the fourth digital code; and the optimal optical swing is the largest from the first optical swing and the second optical swing.

18. The method of claim 17, further comprising:

generating, by a heater digital signal processor (DSP), a first reference digital-to-analog converter (DAC) code corresponding to a first candidate reference voltage, wherein the first candidate temperature control signal drives the measured voltage towards the first candidate reference voltage;

generating, by the heater DSP, a second reference DAC code corresponding to a second candidate reference voltage, wherein the second candidate temperature control signal drives the measured voltage towards the second candidate reference voltage;

generating, by the heater DSP, a first thermal DAC code corresponding to the first candidate temperature control signal;

generating, by the heater DSP, a second thermal DAC code corresponding to the second candidate temperature control signal;

converting, by a reference DAC, the first reference DAC code to the first candidate reference voltage and the second reference DAC to the second candidate reference voltage; and converting, by a thermal DAC, the first thermal DAC code to the first candidate temperature control signal and the second thermal DAC code to the second candidate temperature control signal.

19. The method of claim 18, further comprising comparing the measured voltage from the converter to a provided reference voltage from the reference DAC and provide results of the comparison to the heater DSP, wherein the first test signal, the high test signal, and the low test signal is generated by a transmit (TX) DSP of the controller.

20. The method of claim 19, further comprising:

storing, in a memory, the first thermal DAC code and the first optical swing in association with the first reference DAC code;

storing, in the memory, the second thermal DAC code and the second optical swing in association with the second reference DAC code; and comparing the stored optical swings to select the optimal optical swings, wherein selecting one of the first candidate temperature control signal or the second candidate temperature control signal includes selecting the stored thermal DAC code corresponding to the optimal optical swing.

* * * * *